(12) United States Patent
Eriksson

(10) Patent No.: US 11,208,122 B2
(45) Date of Patent: Dec. 28, 2021

(54) SUSPENSION DEVICE FOR CABLES AND TUBINGS

(71) Applicant: Flexiwaggon AB, Östersund (SE)

(72) Inventor: Jan Eriksson, Nälden (SE)

(73) Assignee: Flexiwaggon AB

( * ) Notice: Subject to any disclaimer, the term of this patent is extended or adjusted under 35 U.S.C. 154(b) by 728 days.

(21) Appl. No.: 15/781,459

(22) PCT Filed: Dec. 11, 2015

(86) PCT No.: PCT/EP2015/079403
§ 371 (c)(1),
(2) Date: Jun. 4, 2018

(87) PCT Pub. No.: WO2017/097373
PCT Pub. Date: Jun. 15, 2017

(65) Prior Publication Data
US 2020/0255038 A1    Aug. 13, 2020

(51) Int. Cl.
*B61D 47/00* (2006.01)
*B61D 3/04* (2006.01)
(Continued)

(52) U.S. Cl.
CPC .............. *B61D 47/005* (2013.01); *B61D 3/04* (2013.01); *B61D 3/187* (2013.01); *F16L 3/015* (2013.01)

(58) Field of Classification Search
CPC .... H02G 11/006; H02G 11/00; B61D 47/005; B61D 3/04; B61D 3/187; F16L 3/015; F16L 3/06
See application file for complete search history.

(56) References Cited

U.S. PATENT DOCUMENTS

| | | | |
|---|---|---|---|
| 7,650,844 B2 * | 1/2010 | Eriksson | B61D 3/184 |
| | | | 105/355 |
| 8,302,235 B1 * | 11/2012 | Bailie | B60P 1/43 |
| | | | 14/69.5 |
| 2013/0146395 A1 * | 6/2013 | D'Angelo | B61D 3/187 |
| | | | 182/137 |

FOREIGN PATENT DOCUMENTS

| | | | | | |
|---|---|---|---|---|---|
| DE | 102013213421 A1 * | 1/2015 | | ......... | H01B 11/002 |
| EP | 2597732 A1 * | 5/2013 | | ......... | H04R 25/556 |

(Continued)

*Primary Examiner* — Daniel J Troy
*Assistant Examiner* — Ding Y Tan
(74) *Attorney, Agent, or Firm* — Condo Roccia Koptiw LLP

(57) ABSTRACT

The invention relates to a railway wagon comprising a load carrier (7) and front and rear bogies (8), each of the bogies being provided with railway track wheels and being electrically, hydraulically and/or pneumatically connected to the load carrier by means of one or more electric cables, hydraulic and/or pneumatic tubings (5). The load carrier is releasably connected to the respective bogies, and in a released state laterally displaceable in relation to the respective bogies by means of a displacement device. The load carrier has a front and a rear end and is at each end provided with a support device and a ramp (13), wherein the support device is adapted to support the load carrier on the ground in a position where it is displaced in relation to the bogie, whereas the ramp is along an inner edge pivotally connected to the end of the load carrier. The ramp is provided with a suspension device on the underside of the ramp including a guide arrangement (1) extending transverse in relation to a longitudinal axis of the load carrier, along which guide arrangement a slider (2) is displaceably movable, wherein the slider is provided with a holder (3) for holding of the one or more cables and/or tubings while allowing transverse (Continued)

movement of the cables and/or tubings together with the slider and holder along the guide arrangement.

7 Claims, 4 Drawing Sheets

(51) Int. Cl.
*B61D 3/18* (2006.01)
*F16L 3/015* (2006.01)

(56) References Cited

FOREIGN PATENT DOCUMENTS

| | | | |
|---|---|---|---|
| WO | WO 96/11829 A1 | 4/1996 | |
| WO | WO-9611829 A1 * | 4/1996 | ........... B61D 47/005 |
| WO | WO 96/37396 A1 | 11/1996 | |
| WO | WO-9637396 A1 * | 11/1996 | ............. B61D 3/184 |
| WO | WO 2006/031178 A1 | 3/2006 | |
| WO | WO 2012/177216 A1 | 12/2012 | |
| WO | WO-2012177216 A1 * | 12/2012 | ............. B61D 47/00 |

* cited by examiner

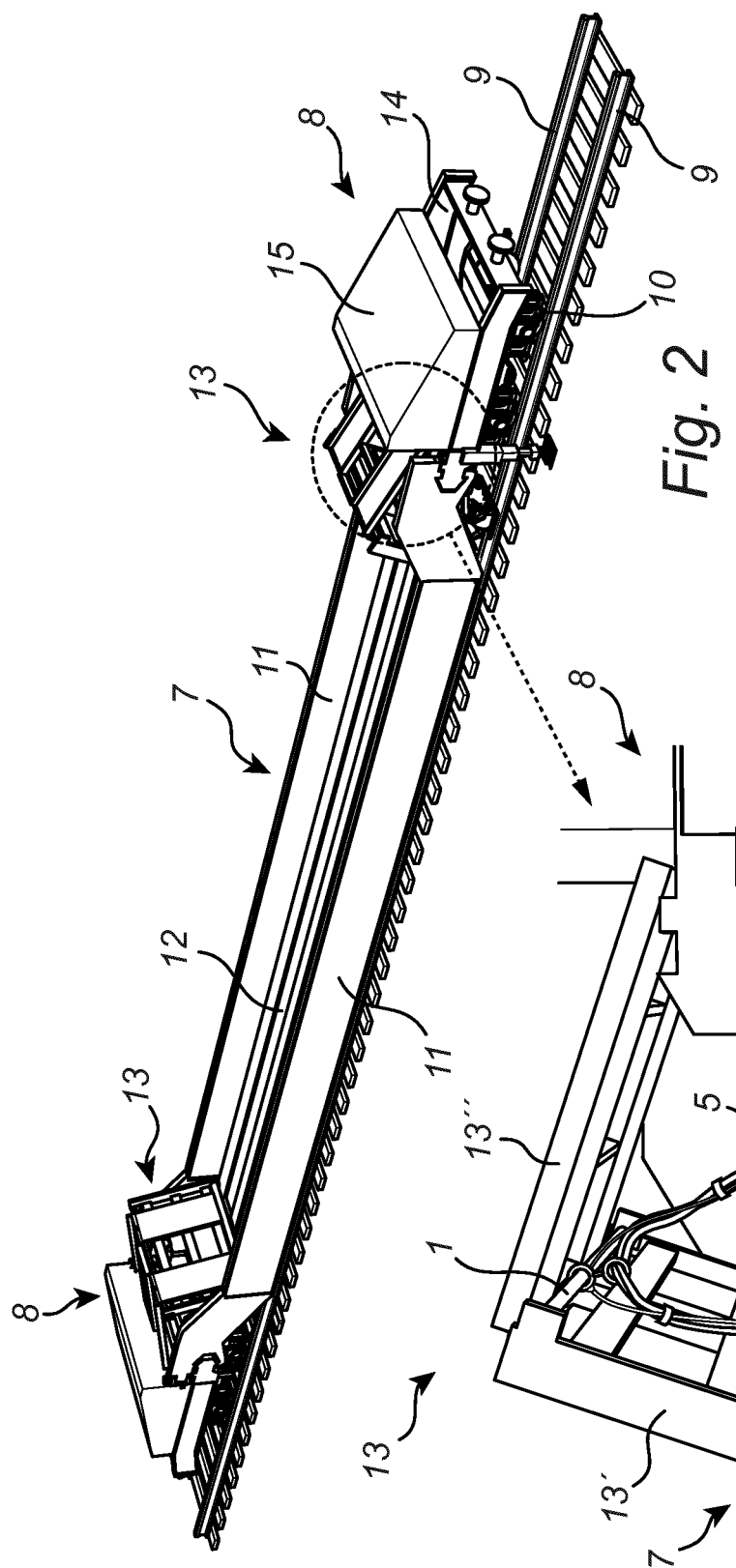
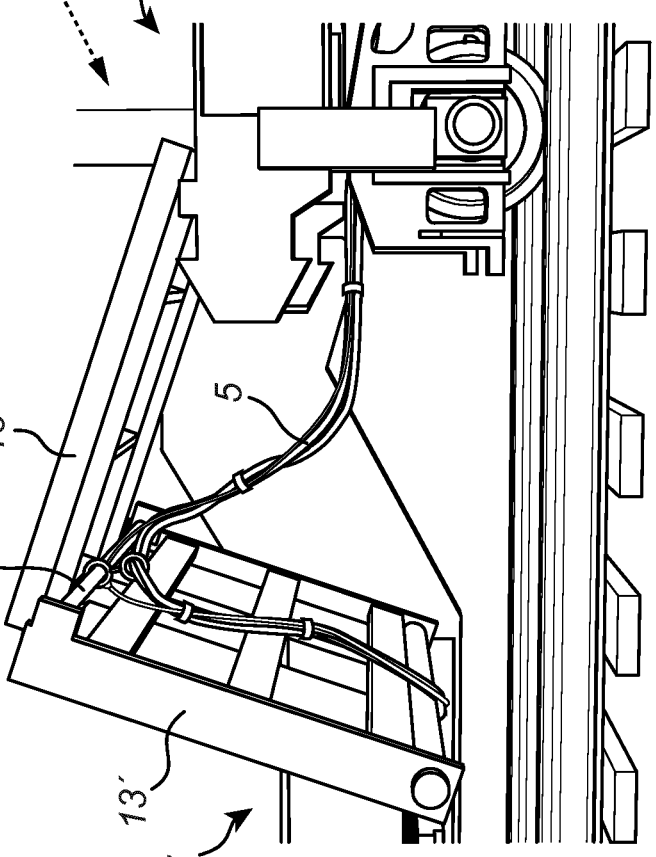

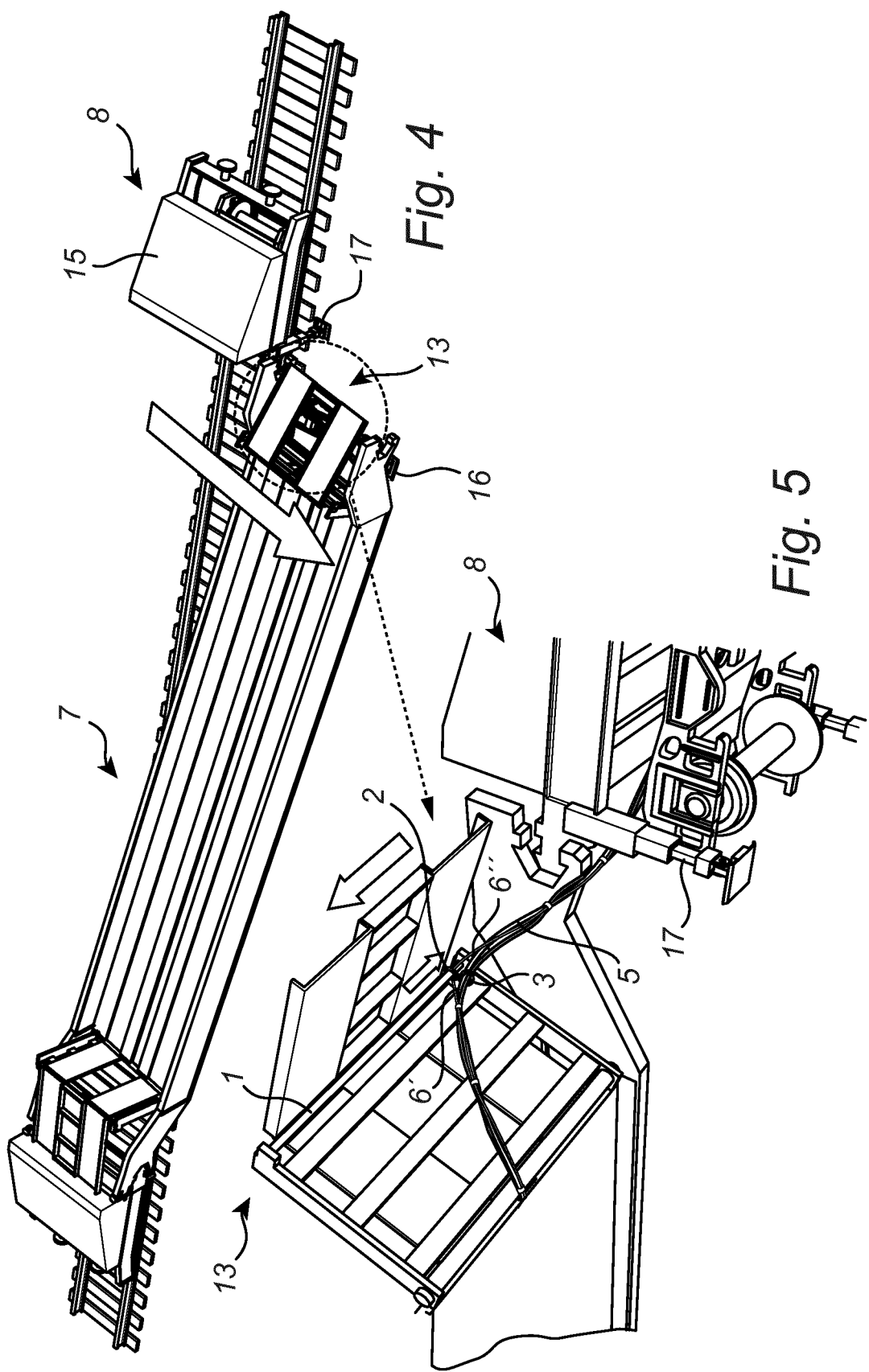

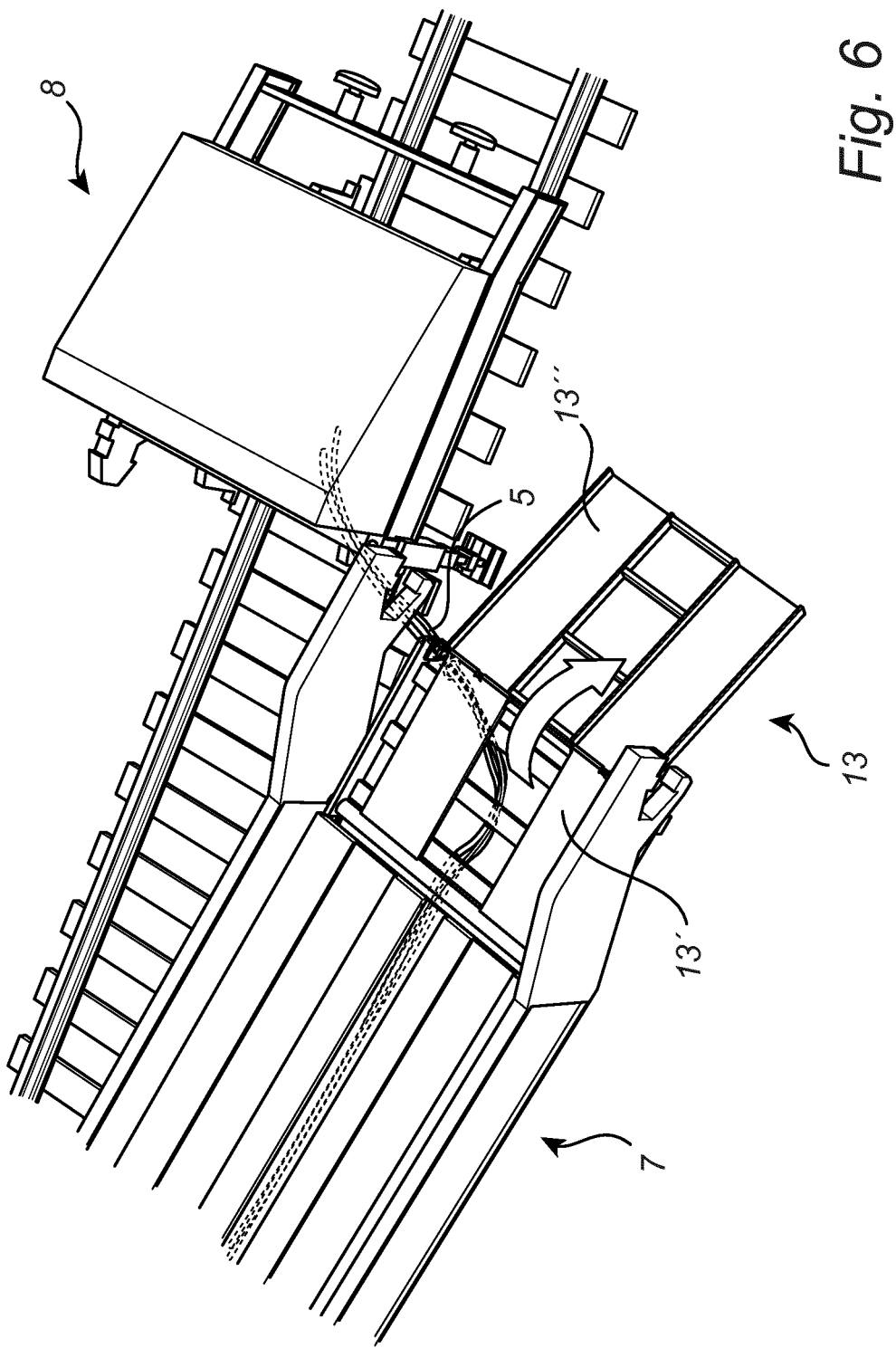

SUSPENSION DEVICE FOR CABLES AND TUBINGS

CROSS REFERENCE TO RELATED APPLICATIONS

This application is the National Stage Entry under 35 U.S.C. § 371 of Patent Cooperation Treaty Application No. PCT/EP2015/079403, filed 11 Dec. 2015, the contents of which are hereby incorporated by reference in their entireties.

FIELD OF THE INVENTION

The present invention relates to a railway wagon comprising a load carrier and front and rear bogies, each of the bogies being provided with railway track wheels and being electrically, hydraulically and/or pneumatically connected to the load carrier by means of one or more electric cables, hydraulic and/or pneumatic tubings, the load carrier being releasably connected to the respective bogies, and in a released state laterally displaceable in relation to the respective bogies by means of a displacement device, the load carrier having a front and a rear end and being at each end provided with a support device and a ramp, the support device being adapted to support the load carrier on the ground in a position where it is displaced in relation to the bogie, whereas the ramp being along an inner edge pivotally connected to the end of the load carrier.

BACKGROUND OF THE INVENTION

It is an environmental benefit to transport vehicles by train. In order to facilitate such transport laterally displaceable railway wagons have been developed. A laterally displaceable railway wagon is a railway wagon that can be laterally displaced by swinging out one end thereof, or more particularly one end of a load carrier that is a part of the whole wagon, to a position outside of the railway tracks such that the vehicle can be driven on or off the load carrier after lowering one end of a ramp of the load carrier to the ground. Alternatively, the load carrier is moved in parallel, or is rotated about its centre such that both ends of the load carrier is positioned outside of the railway tracks. After loading and/or unloading the desired vehicles the load carrier is returned to its original position and the train may depart. Examples of railway wagons of this kind are disclosed in e.g. WO 96/37396, WO 06/031178 and WO 12/177216.

One problem with that kind of railway wagons is that the load carrier and the wheel bogies in each of its ends are electrically, hydraulically and pneumatically connected by means of electric cables and hydraulic and pneumatic tubings. These cables and tubings are essential since they connects the whole train set and supplies each wagon with electric current for communicating, lightning, warming or cooling purposes, and with hydraulic or pneumatic fluid for actuating brakes, hydraulic and pneumatic cylinders or the like. Therefore it is not an option to disconnect the cables and tubings each time a load carrier is displaced from its associated bogie or bogies, since then also a large number of the other railway wagons in the train set could be out of lightning, warming, cooling, braking effect, supply of hydraulic and pneumatic fluid for various other operations and the like. There could for example be also other vehicle transporting wagons in the train set which are to be loaded or unloaded at the same time, which then would be impossible since the power supply via the cables and tubings is interrupted.

Accordingly, the cables and tubings have to be manufactured in such long lengths that the electric, hydraulic and/or pneumatic connections can be maintained between an end of the load carrier and its associated bogie even after releasing the load carrier from the bogie and displacing the end of the load carrier to a position outside of the railway tracks. However, with such long lengths of the cables and tubings it is of major importance that the slack or excess length of the cables and tubings is taken care of such that they are not damaged by e.g. being dragged along the ground when driving the train or by being squeezed between the ramp and the ground or between the vehicle and the ground during loading and unloading of a vehicle.

One way to deal with this problem in prior art, has been to arrange the cables and tubings in a chain formed cable carrier having an interior channel into which the cables and tubings can be accommodated, for example as cable carriers made available from the German company Tsubaki Kabelschlepp Gmbh. The cable carrier is then attached in one end to the bogie and in the other end to the load carrier. This has to result that the cable carrier will hang freely between the bogie and the load carrier in the displaced position of the load carrier. In order to ensure correct bending and folding of the cable carrier when bringing together the load carrier with the bogie, it has been necessary to arrange guide wheels on the load carrier and also to attach some form of resilient means, e.g. an elastic cord, in order to draw the cable carrier into a storage space, such as for example a central channel in the load carrier. However, such a solution suffers from some serious disadvantages. For one thing such cable carriers are quite expensive to purchase and install. Moreover, these cable carriers have also turned out to be too sensitive for the exposed location between two railway wagons where they are exposed to dirt, rain, snow and ice formation, which may deteriorate its function to a large extent. For example, when exposed to snow and ice formation, the interior channel of the cable carrier can be so filled with snow and ice such the cable carrier will open up when straightening and/or bending the cable carrier during displacing of the load carrier, with result that the cables and tubings may fall out from the cable carrier and run the risk of being damaged.

SUMMARY OF THE INVENTION

An object of the present invention is to provide an improved, uncomplicated and inexpensive suspension device for cables and tubings extending between the load carrier and each bogie of a railway wagon, as presented in the introductory part, which will reduce the risk for the cables and tubings to become damaged. At least this object is achieved by a suspension device according to claim 1.

Accordingly, the basis of the invention is the insight that this object may be achieved by providing a suspension device on the underside of the ramp. The suspension device includes a guide arrangement extending transverse in relation to a longitudinal axis of the load carrier, along which guide arrangement a slider is displaceably movable. The slider is provided with a holder for holding of the one or more cables and/or tubings while at the same time allowing transverse movement of the cables and/or tubings together with the slider and holder along the guide arrangement. A suspension device designed in this way makes it possible to provide sufficient slack, i.e. sufficient long length of the cables and tubings to allow for the displacing of the load carrier during loading and unloading of vehicles without the risk for each of the cables and tubings to be teared apart, while at the same time prevent the cables and tubings to be dragged against the ground during transportation since they are lifted up by the ramp, which is raised while driving the train. Due to the guide arrangement and the slider, the bundle of cables and tubings will automatically be displaced to the one side of the ramp when the load carrier is displaced into its load and unload state, i.e. to the side of the ramp which is closest to the bogie. This allows to make the slack of the cables and tubings as short as possible and also reduces the risk for the cables and tubings to be damaged by being run over by a vehicle or squeezed between the outer end of the ramp and the ground since the bundle of cables and tubings will extend out at the side of the ramp and bridging the distance between the suspension device and the bogie.

Naturally, the invention can be varied and modified in many different ways within the scope of the claims. In a hereinafter described and illustrated embodiment of the invention, the ramp is composed of two ramp portions and more precisely an inner ramp portion being along an inner edge pivotally connected to the end of the load carrier and an outer ramp portion being along an inner edge pivotally connected to an outer edge of the inner ramp portion. In an up-lifted state of the ramp, the inner ramp portion will accordingly be pivoted upwards while the outer ramp portion will be pivoted downwards. Hereby it is created an inner hollow or corner between the two ramp portions. In the exemplary embodiment, the suspension device is arranged in this inner hollow, which is advantageous since the suspension device, cables and tubings thereby will be located in a position where they are to some extent protected against the environment. However, it is to be understood that the suspension device could be mounted on the underside of any arbitrary ramp, e.g. a ramp manufactured in one piece.

Moreover, the suspension device in the described and illustrated exemplary embodiment comprises a guide arrangement in form of a rod with a circular cross section, and a slider in the shape of a circular ring which is slidably arranged on the guide rod and a holder also in the shape of a circular ring interconnected with the slider. It is to be understood however, that the suspension device could be designed in many other different ways. For example a guide arrangement formed as a T-shaped slot into which a slider engages in a slidable manner. The holder according to the embodiment, in the shape of a circular ring, allows the cables and tubings to slide there through in their longitudinal direction. However, the holder could also be of a type that clamp around the cables and tubings and prevents longitudinal movement. For the purpose of traction relief of the cables and tubings, a traction wire is arranged between the load carrier and the slider as well as between the bogie and the slider. However, instead of separate traction wires, at least one of the cables and tubings could be manufactured with a built-in traction reinforcement.

BRIEF DESCRIPTION OF THE DRAWINGS

An exemplary embodiment of the invention will now be described in more detail with reference to the appended drawings in which:

FIG. 2 is a perspective view from above of a railway wagon according to the invention in a state ready for driving;

FIG. 3 is a partly cut through and enlarged perspective view of the area as indicated in FIG. 2;

FIG. 4 is a perspective view of the railway wagon illustrated in FIG. 2 having one end of the load carrier displaced laterally such that it is positioned outside of the railway tracks but with the ramp raised;

FIG. 5 is a partly cut through and enlarged perspective view from below of the area as indicated in FIG. 4; and FIG. 6 is a perspective view from above of the displaced end of the load carrier having the ramp lowered.

DESCRIPTION OF AN EMBODIMENT OF THE INVENTION

Figure 1:
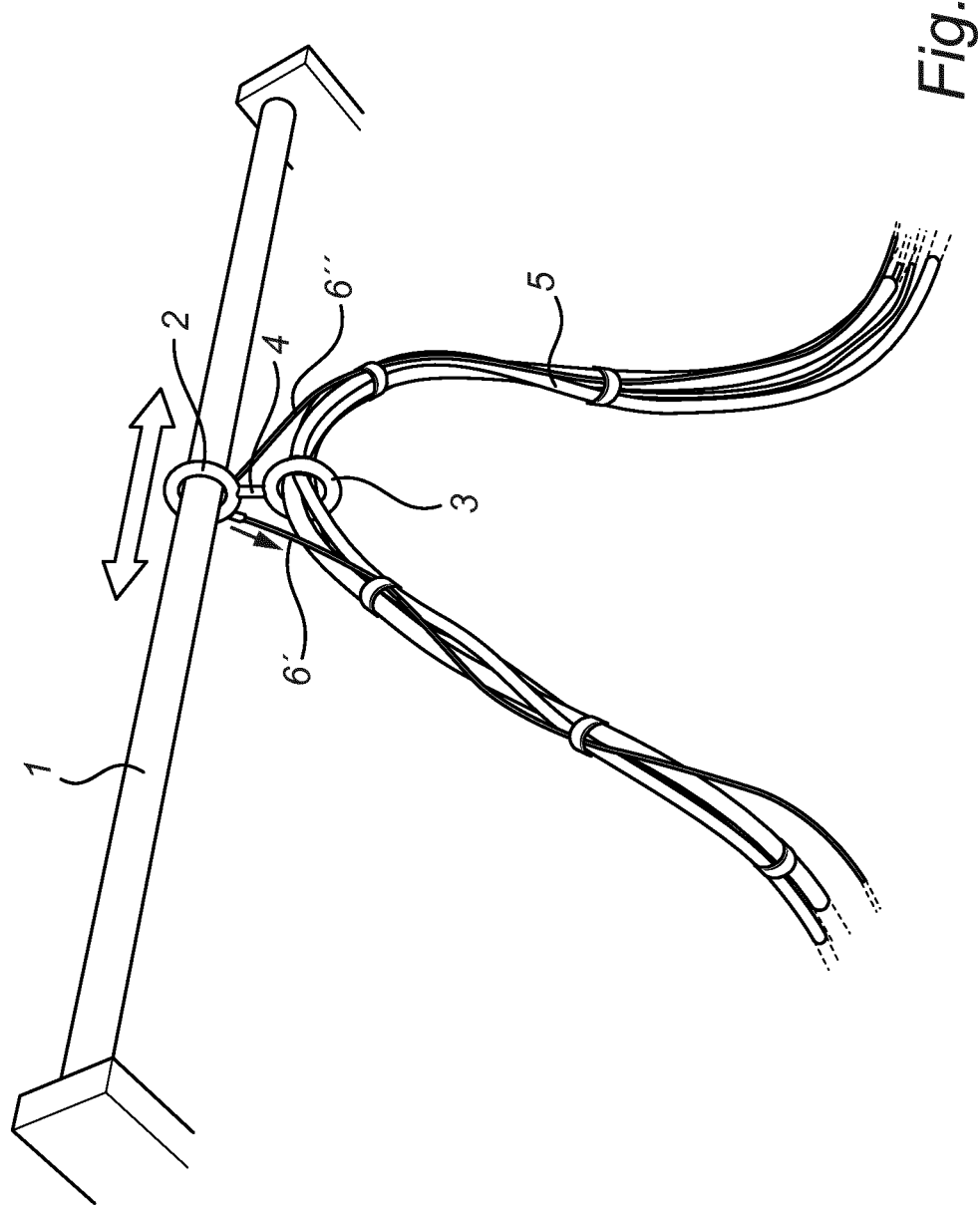
FIG. 1 is a perspective view from below of en embodiment of a suspension device according to the invention.

Reference is first made to FIG. 1 in which an embodiment of the inventive suspension device is illustrated in a perspective view from below. The suspension device comprises a guide arrangement in form of a rod 1 having a circular cross section, a slider 2 in the shape of a circular ring, which is slidably arranged on the guide rod 1, and a holder 3, also in the shape of a circular ring, which is rotatably connected to the slider 2 by means of a bolt 4 or the like. A bundle 5 of cables and tubings passes through the holder 3 such that they can move in their longitudinal direction through the holder. In order to protect the cables and tubings from tractive forces two traction wires are arranged and more precisely a first traction wire 6', which is connected to the slider 2 in one end and a load carrier 7 (not shown in FIG. 1) in the other end, as well as a second traction wire 6", which is connected to the slider 2 in its one end and a bogie 8 (not shown in FIG. 1) in the other end. Hereby, all traction forces for displacing the slider 2 along the guide rod 1 can be taken up by the traction wires 6', 6".

Reference is then made to FIG. 2, in which a railway wagon according to the invention is illustrated in a perspective view from above. The railway wagon is in a transportation state standing on a railway track including two rails 9 and is of a type adapted for transportation of road vehicles, such as e.g. trucks, buses, passenger cars and the like, and comprises for this purpose a load carrier 7, which in its respective ends is releasably connected to a bogie 8 having railway track wheels 10. The load carrier 7 comprises a lateral beam 11 extending on each side along its length, a bottom 12 serving as a carriageway for the vehicles to be transported, and an access ramp 13 at each end. The ramps are in this figure showed in a raised transportation state but can be lowered in a loading and unloading state such that their outer ends bears against the ground for allowing the vehicles to be driven up or down on the load carrier, as will be further described and illustrated hereinafter. Each bogie 8 comprises a wheel undercarriage having four railway track wheels 10 and a frame 14 with an upper casing 15, wherein the frame is swivelling connected to the wheel undercarriage such that the frame 14 at least to some extent can rotate in a horizontal plane in relation to the wheel undercarriage.

FIG. 3 is a perspective view of the area indicated in FIG. 2 in which the closest lateral beam is omitted for the sake of better visibility. As can be seen the ramp 13 is composed of two ramp portions. Namely an inner ramp portion 13' being along an inner edge pivotally connected to the end of the load carrier 7, and an outer ramp portion 13" being along an inner edge pivotally connected to an outer edge of the inner ramp portion 13'. In an up-lifted state of the ramp 13, as is shown in FIG. 3, the inner ramp portion 13' is accordingly pivoted upwards while the outer ramp portion 13" is pivoted downwards. Hereby it is created an inner hollow or corner between the two ramp portions in which the suspension device is arranged. More precisely, the suspension device is mounted at the inner side of the rotatable joint between the inner and outer ramp portions 13', 13" with the guide rod 1 extending transverse in relation to a longitudinal axis of the load carrier 7. As can be seen the bundle 5 of cables and tubings interconnecting the load carrier 7 and the bogie 8 is located at approximately the middle of the guide rod 1 in this transportation state and the excess length of the cable and tubing bundle 5 is held up well above the ground.

Reference is then made to FIGS. 4 and 5, in which one end of the load carrier 7 has been released from the bogie 8 and displaced sideways to a position outside of the railway track. The displacing sideways of the load carrier is carried out by means of a displacement device, preferably positioned within the bogie casing 15, which is not the subject of the present application and therefore not specifically described and illustrated herein but could for example be designed as disclosed in the prior art patent documents as mentioned before. In this loading and unloading state of the railway wagon the outer end of the load carrier 7 is resting on the ground by means of separate support devices 16, which are vertically adjustable by means of e.g. hydraulic cylinders. In order to avoid overturn of the bogie 8 during displacing of the load carrier 7, the bogie is provided with tilt preventing means 17, which preferably also are vertically adjustable towards and away from the ground by means of hydraulic cylinders. It is to be noted that when the load carrier 7 is in this sideway displaced state the slider 2 and holder 3, and hence also the cable and tubing bundle 5, has automatically assumed a position at the end of the guide rod 1 that is located closest to the railway track and the bogie 8. This displacement of the slider and holder is performed by means of the traction wires 6', 6" when the total length of the cable and tubing bundle 5 has been exceeded.

In the displaced position of the load carrier, as illustrated in FIGS. 4 and 5, the ramp 13 is still raised. Turning now to FIG. 6, which is a perspective view from above and which illustrates a situation where the load carrier 7 is still displaced sideways and the ramp 13 is being lowered by lowering the inner ramp portion 13' and at the same time stretching out or raising the outer ramp portion 13". As can be seen the bundle 5 of cables and tubings then extends from the load carrier 7 to the bogie 8 below the longitudinal edge of the ramp 13 which is closest to the railway track and the bogie 8. The main part of the cable and tubing bundle 5 will in this position rest on the ground but will, due to its position, not be in danger for being squeezed between the outer end of the ramp or to be run over by any vehicle driving up or down the ramp during loading or unloading.

While the invention has been illustrated and described in detail in the drawings and foregoing description, such illustration and description are to be considered illustrative or exemplary and not restrictive; the invention is not limited to the disclosed embodiment. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A railway wagon comprising a load carrier, a front bogie, and a rear bogie, interconnected by one or more cables and/or tubings extending between the load carrier and each bogie of the railway wagon, the railway wagon comprising:
   a suspension device for said cables and/or tubings, wherein the suspension device includes a guide arrangement extending transverse in relation to a longitudinal axis of the load carrier, along which guide arrangement a slider is displaceably movable, the guide arrangement having a first end and a second end in the transverse direction, the slider being provided with a holder for holding said cables and/or tubings while allowing transverse movement of said cables and/or tubings together with the slider and holder along the guide arrangement from a first position proximal to the first end to a second position proximal to the second end.

2. The railway wagon of claim 1, wherein the guide arrangement comprises a rod.

3. The railway wagon of claim 1, further comprising a first traction wire arranged between the slider and the corresponding bogie and a second traction wire arranged between the load carrier and the slider.

4. The railway wagon of claim 1, wherein the slider and the holder are connected.

5. The railway wagon of claim 1, wherein the slider and the holder are rotatably connected.

6. A railway wagon comprising a load carrier, a front bogie, and a rear bogie, interconnected by one or more cables and/or tubings, the railway wagon comprising:
   a rod extending transverse in relation to a longitudinal axis of the load carrier, wherein the rod extends from a first end on a first side of the load carrier to a second end on the other side of the load carrier;
   a slider, displaceably movable along the rod; and
   a holder, rotatably connected to the slider, for holding said cables and/or tubings while allowing transverse movement of said cables and/or tubings together with the slider and holder along the rod, wherein the slider and holder are adapted to move between the first end and the second end.

7. The railway wagon of claim 6, further comprising a first traction wire arranged between the slider and the corresponding bogie and a second traction wire arranged between the load carrier and the slider.

\* \* \* \* \*